US011144363B1

(12) United States Patent
Francis Conde et al.

(10) Patent No.: US 11,144,363 B1
(45) Date of Patent: Oct. 12, 2021

(54) WORKFLOW MANAGEMENT SYSTEM

(71) Applicant: Amazon Technologies, Inc., Seattle, WA (US)

(72) Inventors: Daniel Francis Conde, Lake Forest Park, WA (US); Lachlan Hillman, Seattle, WA (US); Prasad Krishnan, Seattle, WA (US); Derek Ying Chen Kwiatkowski, Seattle, WA (US); Mats Erik Lanner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 15/708,007

(22) Filed: Sep. 18, 2017

(51) Int. Cl.
*G06F 9/455* (2018.01)
*G06F 9/50* (2006.01)
*G06F 9/48* (2006.01)
*G06F 9/46* (2006.01)
*G06F 16/13* (2019.01)

(52) U.S. Cl.
CPC ........ *G06F 9/5077* (2013.01); *G06F 9/45558* (2013.01); *G06F 9/461* (2013.01); *G06F 9/4843* (2013.01); *G06F 16/13* (2019.01)

(58) Field of Classification Search
None
See application file for complete search history.

(56) References Cited

U.S. PATENT DOCUMENTS

| | | | |
|---|---|---|---|
| 9,710,307 B1 * | 7/2017 | Corley | G06F 9/4843 |
| 10,142,174 B2 * | 11/2018 | Yang | H04L 41/5054 |
| 2005/0050540 A1 * | 3/2005 | Shaughnessy | G06F 9/546 |
| | | | 718/1 |
| 2009/0204470 A1 * | 8/2009 | Weyl | G06Q 10/06311 |
| | | | 705/7.13 |
| 2011/0271145 A1 * | 11/2011 | Silberstein | G06F 11/1443 |
| | | | 714/18 |
| 2011/0320605 A1 | 12/2011 | Kramer et al. | |
| 2012/0096468 A1 | 4/2012 | Chakravorty et al. | |
| 2014/0068734 A1 | 3/2014 | Arroyo et al. | |
| 2014/0317218 A1 | 10/2014 | Chiba | |
| 2015/0220404 A1 * | 8/2015 | Borden | G06F 11/1458 |
| | | | 714/15 |
| 2015/0263900 A1 * | 9/2015 | Polyakov | H04L 67/10 |
| | | | 709/203 |
| 2016/0344671 A1 | 11/2016 | Hussain et al. | |

(Continued)

*Primary Examiner* — Kenneth Tang
(74) *Attorney, Agent, or Firm* — Davis Wright Tremaine LLP

(57) ABSTRACT

A workflow orchestration service coordinates the performance of a workflow. The workflow is accomplished by performing a task on each resource in a set of resources. In an embodiment, the resources are virtual computer system instances and the task is a set of commands to be run on each of the virtual computer system instances. As a result of a request, the workflow orchestration service initiates a task instance for each resource in the set of resources in accordance with a set of workflow parameters. In an embodiment, the workflow parameters include a parameter that limits the number of concurrent active task instances. In an embodiment, the workflow parameters identify condition that aborts the performance of the workflow. In an embodiment, upon failure of a task instance, the workflow orchestration service rolls back the state of an associated resource to a state before the task was initiated.

20 Claims, 11 Drawing Sheets

(56) References Cited

U.S. PATENT DOCUMENTS

2016/0359924 A1   12/2016  Roth et al.
2018/0285138 A1   10/2018  Jeong et al.
2019/0050301 A1*  2/2019  Juniwal ................. G06F 3/0689
2019/0079750 A1*  3/2019  Foskett .................... G06F 8/71

* cited by examiner

WORKFLOW MANAGEMENT SYSTEM

BACKGROUND

Computing systems are used by businesses to perform various business-related tasks. As the business grows, the number and size of business-related tasks may become so large that it becomes impractical to perform the tasks using a single computer system. Therefore, some businesses create a workflow that includes a collection of tasks that are distributed to a set of computing resources. A workflow management service distributes the tasks to a set of computing resources, and the set of computing resources executes the tasks. The results of task execution are returned to the workflow management service, which generates a result for the workflow which is returned to the requester. In such an environment, various tasks in the workflow may succeed or fail, making it very difficult to control and coordinate the workflow. For this reason, improving the management of workflows is an important problem.

BRIEF DESCRIPTION OF THE DRAWINGS

Various techniques will be described with reference to the drawings, in which.

DETAILED DESCRIPTION

Figure 1:
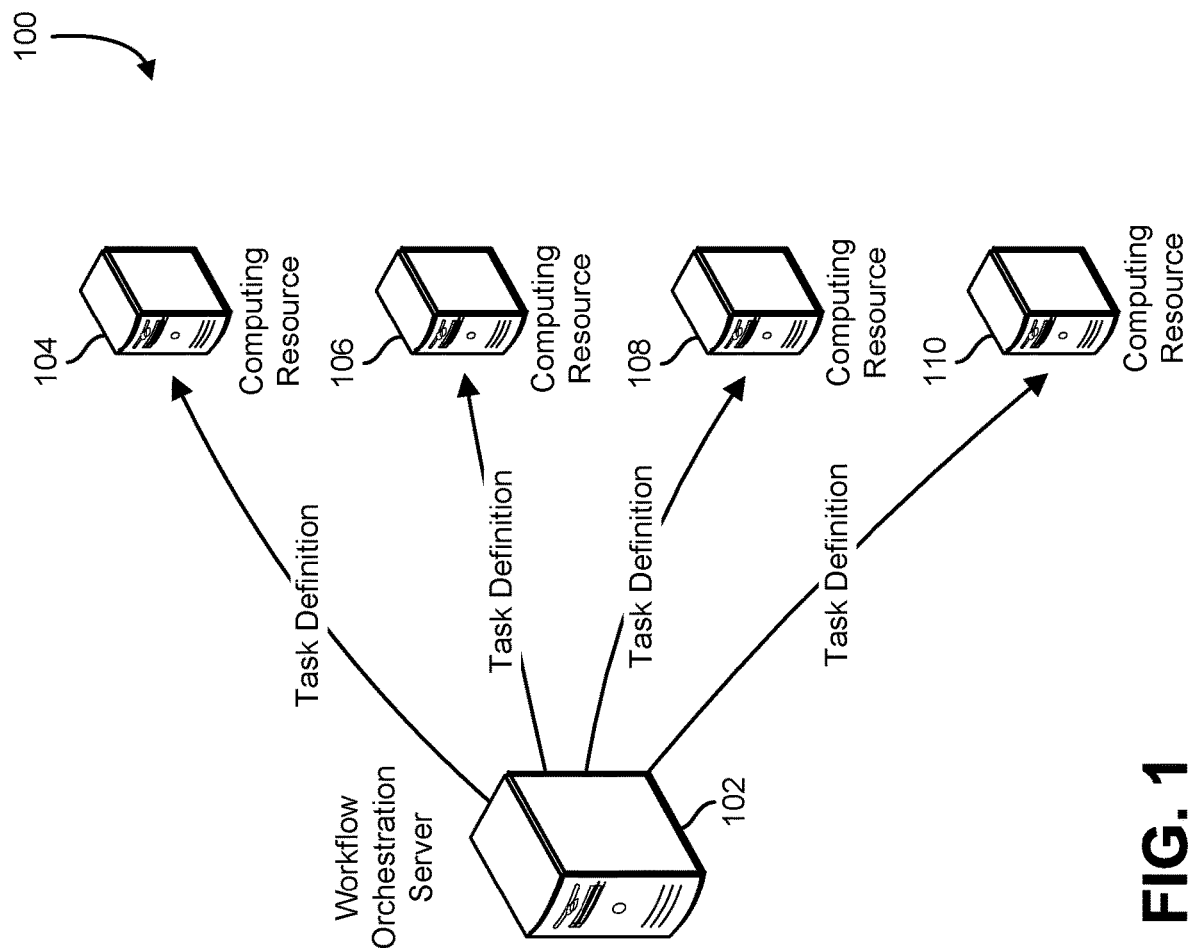
FIG. 1 shows a system in accordance with one embodiment.

The present document describes a system that provides improved management of workflows by controlling the number of active tasks that are associated with a workflow. In an embodiment a workflow is accomplished by performing a task on each of a set of resources. In an embodiment, the resources are virtual computer system instances and the task is a set of commands to be run on each of the virtual computer system instances. In an embodiment, a workflow request is submitted by a customer to a workflow orchestration server. In an embodiment, the workflow request identifies the set of resources and the task to be performed, and includes a set of workflow parameters, where the workflow parameters specify a velocity limit and a failure criterion for the workflow. In an embodiment, the velocity limit specifies or otherwise indicates the number of tasks that can be active at a given time. In an embodiment, the failure criterion specifies a threshold number of failed tasks that may occur before the workflow is terminated. By combining a velocity limit with the failure criterion, control over the workflow is improved by limiting the impact of a failed workflow. In an embodiment, an errant task is submitted as part of a workflow request, but because of the velocity limit, the failure criterion is met and the workflow is aborted before the task can be launched on the remaining resources.

In an embodiment, the failure criterion may be determined in a variety of different ways. In an embodiment, the failure criterion is a threshold number of failed tasks that is configured by a workflow administrator or received with a workflow request. In an embodiment, the failure criterion is a percentage of completed tasks, and the percentage is configured by a workflow administrator or received with a workflow request. In an embodiment, the failure criterion is adjusted during the processing of the workflow. In an embodiment, the workflow orchestration server launches a task instance for each resource, and as a result is received for each task instance; the failure criterion is adjusted based at least in part on the number of completed task instances and the number of failed task instances. In an embodiment, the failure criterion is adjusted based at least in part on the number of resources remaining to be processed in the workflow. In an embodiment, a task instance may return a rollback status that indicates that the task did not complete successfully, and that the resource was not modified by the task. In an embodiment, a task instance that results in a rollback status has a different effect on the failure criterion than a task instance that results in a failure status.

In an embodiment, the velocity limit is a number of active task instances allowed during processing of the workflow. In an embodiment, the velocity limit is specified as a function of the number of successfully completed task instances. In an embodiment, the velocity limit includes a release criterion that allows the workflow orchestration server to use an unlimited number of active task instances when the release criterion is met. In an embodiment, the release criterion is a number of successful task instances. In an embodiment, the release criterion is a minimum number of completed task instances combined with a minimum success rate for the completed task instances.

In an embodiment, the workflow orchestration server manages task instances so that resources are not altered by failed task instances. In an embodiment, the workflow orchestration server saves the state of a particular resource before initiating a task instance on the particular resource. In an embodiment, if the task instance fails, the workflow orchestration server restores the state of the particular resource using the saved state. In an embodiment, if the task instance fails, the workflow orchestration server modifies the particular resource to reverse the effects of the task instance. In an embodiment, if the workflow orchestration server is unsuccessful in performing the workflow, the workflow orchestration server rolls back the states of all of the resources on which task instances have been performed.

In an embodiment, the workflow orchestration server manages a workflow that designates a set of executable instructions to be run on a set of computing resources. In an embodiment, the set of computing resources is a set of computer servers, computer clients, virtual computer systems, or network appliances. In an embodiment, the executable instructions are: compiled machine instructions that are compatible with the type of computing resources; source code that is compiled into native instructions by the computing resources; intermediate code that is executed on a runtime on the computing resources; or a script that is run on an execution engine hosted by each of the computing resources.

In an embodiment, the workflow orchestration server manages a workflow where a task is performed on a collection of data objects. In an embodiment, the task may be a set of structured query language ("SQL") commands, or other data manipulation commands. In an embodiment, the data objects are data elements in a relational database, and for each data object, the workflow orchestration server executes a set of SQL commands on the relational database to process a data object. In an embodiment, the number of objects being updated at any particular time is limited by a velocity limit defined in a set of workflow parameters.

FIG. 1 shows a system in accordance with one embodiment. A system diagram 100 illustrates an example of a workflow orchestration server 102 that processes a customer workflow using a collection of computing resources. In an embodiment, the workflow orchestration server 102 is a computer system, computer server, virtual computer system, or other computing device or service that hosts a workflow orchestration service. In an embodiment, functionality of the workflow orchestration server is performed by a cluster of devices distributed over a network. In an embodiment the workflow orchestration service is a set of executable instructions stored in a memory on the workflow orchestration server 102 that, when executed by a processor of the workflow orchestration server 102, manage the processing of the workflow. In an embodiment, the workflow is processed by performing a task on each of the computing resources. In an embodiment, the workflow orchestration server 102 performs the task at each of the computing resources by distributing a task definition to each of the computing resources. In an embodiment, the task definition is a set of executable instructions, an executable script, an intermediate executable, a piece of source code, or an identifier that identifies a set of executable instructions present on the computing resource.

In an embodiment, the collection of computing resources includes a first computing resource 104, a second computing resource 106, a third computing resource 108, and a fourth computing resource 110. In an embodiment, the computing resources may be computer systems, virtual computer systems, computing appliances, mobile devices, computing services, computing runtime engines, or serverless computing services. In an embodiment, the workflow orchestration server 102 communicates with the collection of computing resources via a computer network such as an Ethernet network, a wireless network, or a fiber-optic network. In an embodiment, the workflow orchestration server 102 communicates with the collection of computing resources using a virtual network. In an embodiment, the workflow orchestration server 102 communicates with the collection of computing resources using an interprocess communication ("IPC") mechanism. In an embodiment, the workflow orchestration server 102 launches the task on each computing resource in the collection of computing resources using a messaging service, or a remote execution application programming interface ("API").

In an embodiment, a workflow administrator 114 uses a workflow management console 112 to send a workflow request to the workflow orchestration server 102. In an embodiment, the workflow request identifies a set of computing resources, and a task to be performed on each resource in the set of computing resources. In an embodiment, the workflow request includes a set of workflow parameters. In an embodiment, the workflow parameters include a velocity parameter that controls the number of computing resources on which the workflow orchestration server 102 can operate at a given time. In an embodiment, the velocity parameter includes a concurrency limit that limits the number of concurrent active tasks. In an embodiment, the velocity parameter is a function of the number of computing resources successfully processed for the given workflow request. In an embodiment, the velocity is allowed to increase after a threshold number of computing resources are processed successfully by the workflow orchestration server 102.

In an embodiment, the workflow parameters include a failure criterion for the workflow. In an embodiment, the failure criterion includes a threshold number of failed task instances that, when exceeded, cause the workflow orchestration server 102 to abort the workflow. In an embodiment, the workflow orchestration server 102 aborts the workflow by not initiating additional tasks on the collection of computing resources. In an embodiment, the workflow orchestration server 102 aborts the workflow by not initiating additional tasks on the collection of computing resources, and by rolling back the state of processed computing resources.

In an embodiment, the workflow administrator 114 uses the workflow management console 112 to submit a workflow request to the workflow orchestration server 102. In an embodiment, the workflow request includes a velocity parameter that specifies a threshold number of active computing resources, and a threshold number of failed computing resources as a failure criterion. In an embodiment, the threshold number of active computing resources may be determined as a number of computing resources that may be "at risk" during processing of the workflow. In an embodiment, the threshold number of computing resources is determined as a percentage of the number of resources. In an embodiment, the threshold number of failed computing resources is determined as a maximum number of computing resources that can be compromised by an errant workflow. In an embodiment, the workflow request specifies a task to be performed on the collection of computing resources. In an embodiment, the workflow orchestration server 102 sends a task definition for the task to each of the computing resources. In an embodiment, the workflow orchestration server 102 causes each computing resource in the set of computing resources to perform the task in accordance with the velocity parameter such that no more than the threshold number of active computing resources is active in any one time.

In an embodiment, the workflow orchestration server 102 acquires results from each of the computing resources in the collection of computing resources. In an embodiment, after receiving each result from a computing resource, the workflow orchestration server 102 determines whether the failure criterion is met. In an embodiment, if the failure criterion is not met, the workflow orchestration server 102 initiates a new task instance on another computing resource. In an embodiment, if the failure criterion is met, the workflow orchestration server 102 aborts the workflow, and does not initiate new task instances. By limiting the number of active task instances, and aborting the workflow if the failure criterion is met, the potential harm done by an improperly configured workflow is limited.

Figure 2:
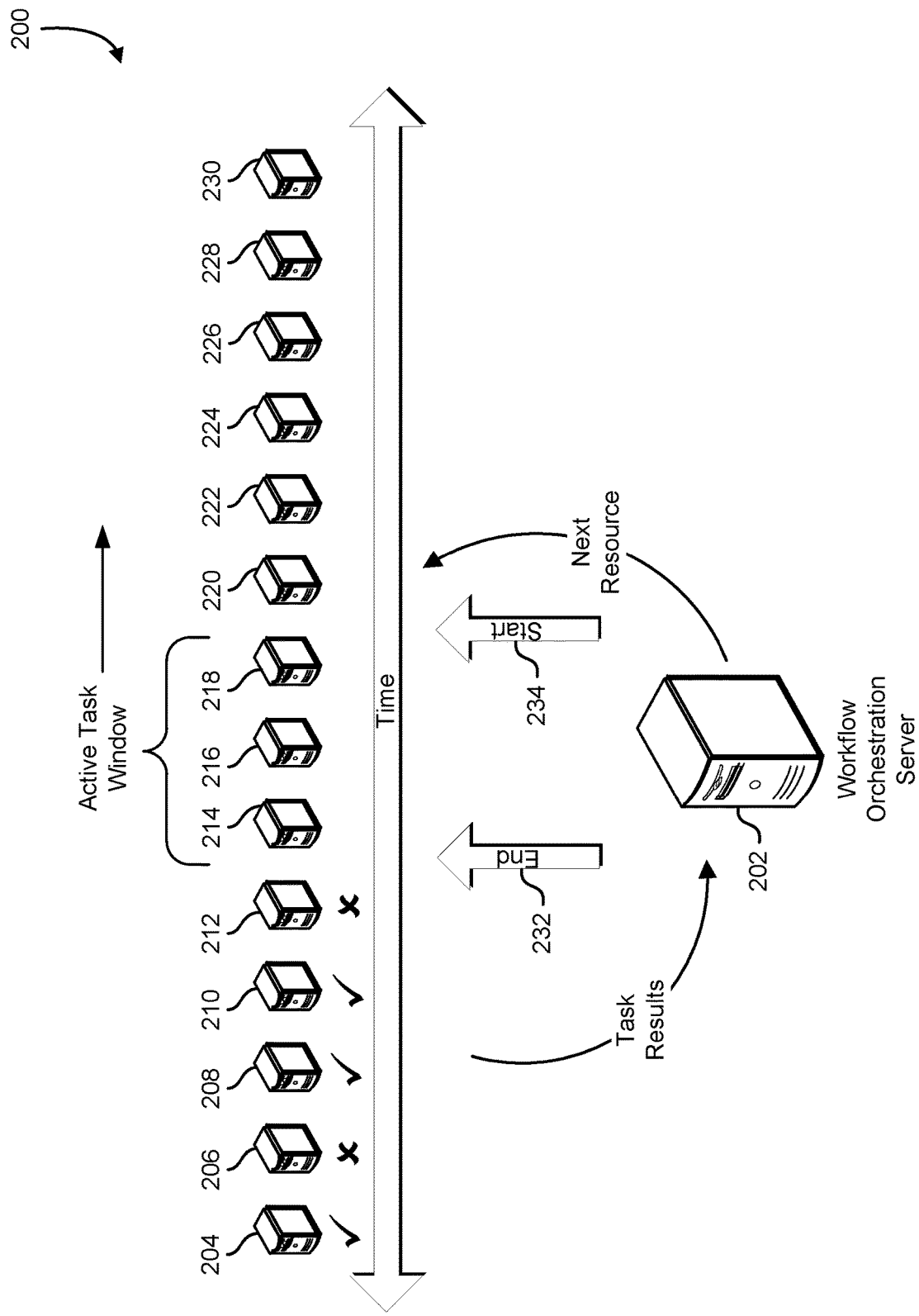
FIG. 2 shows an illustrative example of processing a workflow in accordance with one embodiment.

FIG. 2 shows an illustrative example of processing a workflow in accordance with one embodiment. A diagram 200 illustrates an example of processing a workflow using an active task window to control the number of active tasks associated with the workflow. In an embodiment, the workflow orchestration server 202 is a server computer system, virtual computer system, or computing service that hosts a workflow orchestration service. In an embodiment, functionality of the workflow orchestration server is implemented using a cluster of devices distributed over a network. In an embodiment, the workflow orchestration service includes a set of executable instructions stored on a memory that, when executed by a processor on the workflow orchestration server 202, cause the workflow orchestration server 202 to process the workflow. In an embodiment, the workflow orchestration server 202 receives a workflow request and a set of workflow parameters. In an embodiment, the set of workflow parameters includes a window size.

In an embodiment, a workflow orchestration server 202 submits a task to each computing resource in a collection of computing resources. In an embodiment, the collection of computing resources includes a set of resources that have been processed by the workflow orchestration server 202, a set of resources that have not yet been processed by the workflow orchestration server 202, and a set of active resources. In an embodiment, individual resources are selected from the set of resources that have not yet been processed, and a task is launched on the selected resource. In an embodiment, after the task completes on the selected resource, the selected resource provides a task result to the workflow orchestration server 202, and the selected resource is added to the set of resources that have been processed by the workflow orchestration server 202. In an embodiment, each computing resource returns a task result to the workflow orchestration server 202 that indicates whether the task failed or completed successfully. In the example shown in FIG. 2, the set of resources that have been processed by the workflow orchestration server 202 includes a first resource 204, a second resource 206, a third resource 208, a fourth resource 210, and a fifth resource 212; the set of active resources includes a sixth resource 214, a seventh resource 216, and an eighth resource 218; and the set of resources that have not yet been processed by the workflow orchestration server 202 includes computing resources 220, 222, 224, 226, 228, and 230. In the example shown in FIG. 2, the first resource 204, the third resource 208, and the fourth resource 210 were processed successfully, and the second resource 206, and the fifth resource 212 were not processed successfully.

In an embodiment, the workflow orchestration server 202 controls the performance of the workflow by maintaining an active task window with a start pointer 234 and an end pointer 232. In an embodiment, the width of the active task window encompasses the maximum number of allowable active resources in accordance with the workflow parameters. In an embodiment, the size of the active task window is adjusted so that the number of active resources within the window is in accordance with the workflow parameters. In an embodiment, as part of managing the workflow, the workflow orchestration server 202 determines the order in which the resources will be processed. In an embodiment, the start pointer 234 identifies the next resource to be processed by the workflow orchestration server 202. In an embodiment, the end pointer 232 indicates the division between resources that have completed processing and resources that are still being processed by the workflow orchestration server 202. In an embodiment, the start pointer 234 is advanced when additional task instances are launched on additional computing resources. In an embodiment, the end pointer 232 is advanced as results are received by the workflow orchestration server 202.

In an embodiment, as task results are received by the workflow orchestration server 202, the workflow orchestration server 202 determines whether a failure criterion for the workflow has been satisfied. In an embodiment, if the workflow orchestration server 202 determines that the failure criterion is satisfied, the workflow orchestration server stops launching tasks on the collection of computing resources, and reports that the workflow has failed. In an embodiment, if the workflow orchestration server 202 determines that the failure criterion is satisfied, the workflow orchestration server attempts to return the collection of computing resources to their original state at the time workflow processing was initiated. If the workflow orchestration server 202 receives a task result from each computing resource in the collection of computing resources without the failure criterion being satisfied, the processing of the workflow is complete, and the workflow orchestration server 202 provides a success status for the workflow.

Figure 3:
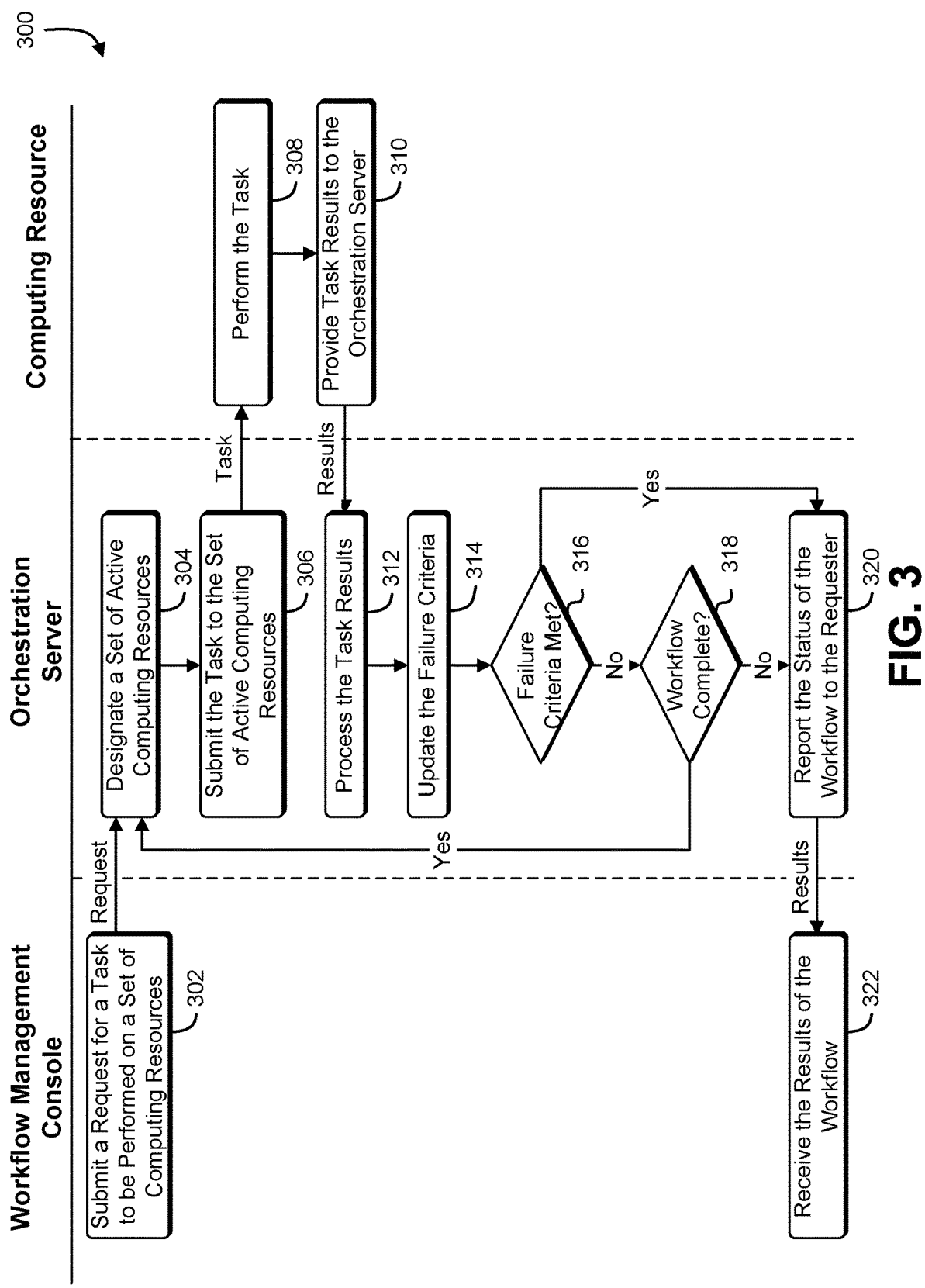
FIG. 3 shows an illustrative example of a process in accordance with one embodiment.

FIG. 3 shows an illustrative example of a process in accordance with one embodiment. A swim diagram 300 illustrates an example of a process that, as a result of being performed by a workflow management console, an orchestration server, and a computing resource, fulfills a workflow request submitted via the workflow management console. In an embodiment, the process begins at block 302 with the workflow orchestration server submitting a request for a task to be performed on a set of computing resources. In an embodiment, the set of computing resources is a set of computer systems, virtual computer systems, computing services, computer servers, or other processing resources. In an embodiment, the task is a script, a piece of source code, a compiled intermediary, or a set of native executable instructions that define the task. In an embodiment, a task is defined as a state machine which defines a set of states and a set of state transitions between individual states where each state transition may be dependent on one or more conditions. In an embodiment, the request includes a set of workflow parameters, and the set of workflow parameters includes a velocity parameter and a failure criterion for the workflow. In an embodiment, the velocity parameter is a threshold number of tasks that may be active at any one time. In an embodiment, the failure criterion is a number of failed tasks or a percentage of failed tasks that cause the workflow to be aborted by the orchestration server.

In an embodiment, at block 304, the orchestration server receives the workflow request from the workflow management console. In an embodiment, the orchestration server designates a set of active computing resources from the set of computing resources on which the task is to be performed. In an embodiment, the number of resources in the set of active computing resources is controlled by the velocity parameter. In an embodiment, at block 306, the workflow orchestration server submits the task to each of the resources in the set of active computing resources. In an embodiment, the task is submitted to each of the resources by providing a task definition to each of the resources, and commanding each of the resources to run the provided task.

In an embodiment, at block 308, the computing resource receives the task submission from the orchestration server and performs the task. In an embodiment, the task is performed by executing a set of instructions received from the orchestration server. In an embodiment, the task submission identifies an executable program on the computing resource, and the computing resource executes the identified program. In an embodiment, the orchestration server provides a script file or intermediate code that is compiled by the computing resource into an executable image, and the executable image is run by the computing resource. In an embodiment, at block 310, the computing resource generates a result from the performance of the task, and the result is provided to the orchestration server.

In an embodiment, at block 312, the orchestration server receives the task results from the computing resource. In an embodiment, the orchestration server uses the task results to determine whether each task instance completed successfully or failed. In an embodiment, as a result of determining the status of a task, the orchestration server notifies the workflow requester of the task status. In an embodiment, at block 314, the orchestration server determines a failure criterion for the workflow. In an embodiment, the failure criterion is updated as each task result is received from an individual computing resource. In an embodiment, the failure criterion is a total number of failed tasks for the workflow. In an embodiment, the failure criterion is determined as a percentage of completed tasks for the workflow. In an embodiment, the failure criterion is determined as a linear function of the number of completed tasks for the workflow. In an embodiment, at decision block 316, the orchestration server determines whether the failure criterion has been met. In an embodiment, if the failure criterion has not been met, execution advances to decision block 318 where the orchestration server determines whether the task has been completed on each of the computing resources in the set of computing resources. If there are additional computing resources on which the task needs to be performed, execution returns to block 304 and additional active computing resources are designated by the orchestration server. If there are not additional computing resources on which the task needs to be performed, execution advances to block 320. In an embodiment, if the failure criterion is met at decision block 316, execution advances to block 320.

In an embodiment, at block 320, the orchestration server reports the status of the workflow to the workflow management console. In an embodiment, if the workflow completes without meeting the failure criterion, the orchestration server returns a successful status for the workflow to the workflow management Council. In an embodiment, if the workflow meets the failure criterion before completing the workflow on each of the computing resources, the orchestration server returns a failure status for the workflow to the workflow management console. In an embodiment, the orchestration server reports the number of failed tasks to the workflow management console. In an embodiment, at block 322, the workflow management console receives a result from the orchestration server.

Figure 4:
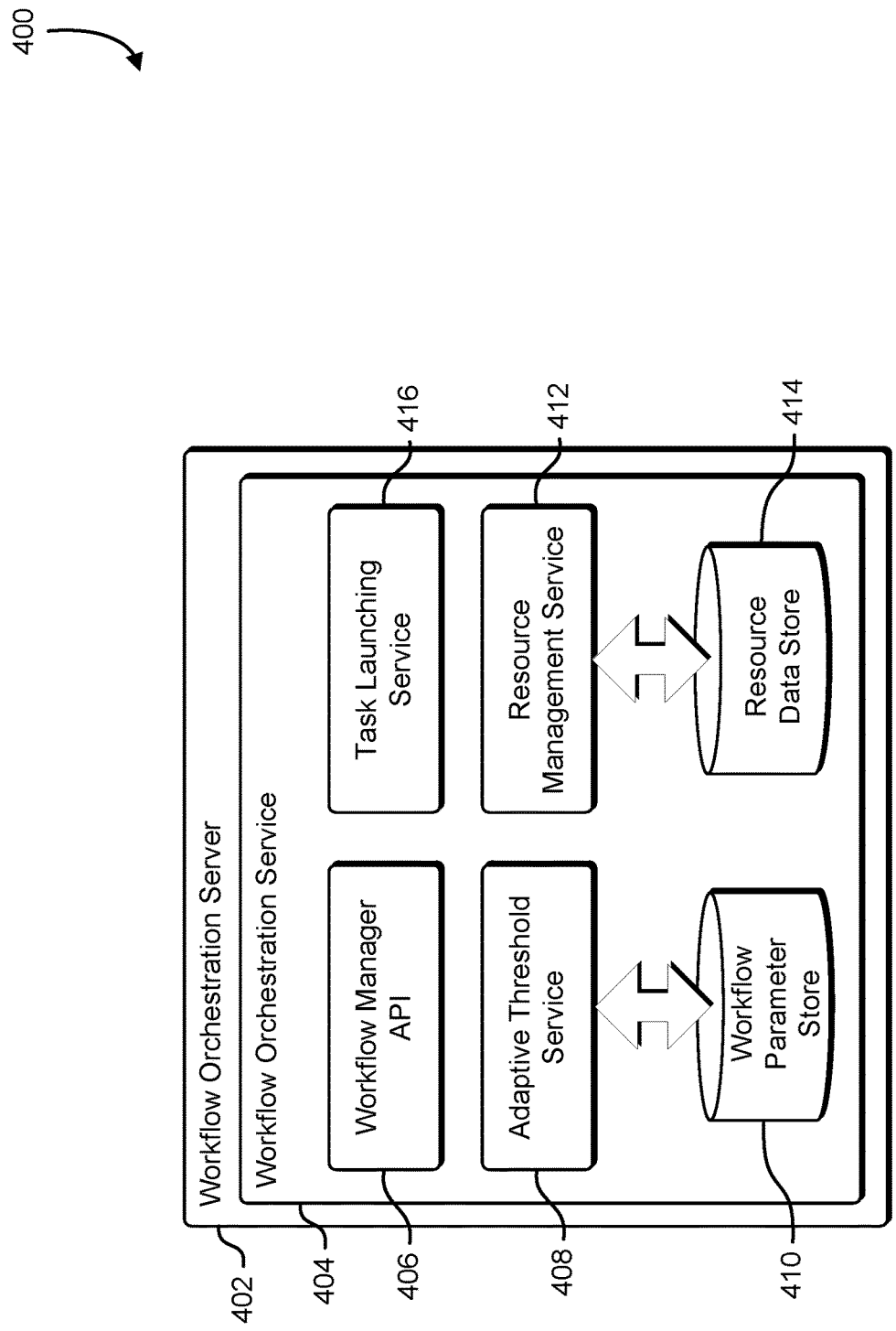
FIG. 4 shows an illustrative example of a workflow orchestration server in accordance with one embodiment.

FIG. 4 shows an illustrative example of a workflow orchestration server in accordance with one embodiment. A diagram 400 illustrates an embodiment of a workflow orchestration server that coordinates the processing of a workflow. In an embodiment, a workflow orchestration server 402 hosts a workflow orchestration service 404. In an embodiment, the workflow orchestration server 402 is a computer system, client computer system, network appliance, virtual computer system, serverless computing runtime, container runtime, or other processing system. In an embodiment, functionality of the workflow orchestration server is implemented using a cluster of devices distributed over a network. In an embodiment, the workflow orchestration service 404 is implemented as a memory storing executable instructions that, when executed by a processor on the workflow orchestration server 402, coordinates the processing of a workflow across a set of resources. In an embodiment, customers submit a workflow request to the workflow orchestration server 402, and the workflow request includes workflow parameters to control the performance of the workflow. In an embodiment, the workflow orchestration server 402 fulfills the workflow by launching the task on a collection of computing resources.

In an embodiment, the workflow orchestration service 404 includes a workflow manager application programming interface ("API") 406, and adaptive threshold service 408, and the workflow parameter store 410. In an embodiment, the workflow manager API is an interface that allows a customer said to submit a workflow request to the workflow orchestration server 402. In an embodiment, the workflow manager API 406 receives workflow requests that are submitted from client computer systems, management consoles, mobile devices, web browsers, or other management interface devices. In an embodiment, the workflow manager API 406 collects workflow parameters that control the processing of the workflow. In an embodiment, the workflow manager API 406 is accessed by a remote procedure call. In an embodiment, the workflow manager API 406 is accessed via a web interface. In an embodiment, the adaptive threshold service 408 calculates velocity parameters and failure criterion for the workflow as the workflow is processed. In an embodiment, the workflow parameters provided with the workflow request are stored in a workflow parameter store 410. In an embodiment, the adaptive threshold service 408 determines a final velocity parameter based at least in part on task results received as the workflow is processed and the workflow parameters are received with a workflow request. In an embodiment, the adaptive threshold service 408 increases the velocity parameter after a threshold number of tasks are completed with a threshold minimum success rate. In an embodiment, after receiving task results from at least one fourth of the computing resources, the adaptive threshold service 408 determines whether any of the completed tasks have failed, and if none of the completed tasks have failed, the constraints of the velocity parameter is removed and tasks are launched on the remaining computing resources. In an embodiment, the adaptive threshold service 408 determines a threshold number of task failures to be used as a failure criterion based at least in part on parameters provided with a workflow request and task results received by the workflow orchestration server 402.

In an embodiment, the workflow orchestration service 404 includes a resource management service 412, the resource data store 414, and the task launching service 416. In an embodiment, the resource management service 412 maintains a database of computing resources in a resource data store 414. In an embodiment, the resource data store maintains a list of computing resources used for processing workflows in association with network address information, capability information, and status information for each of the computing resources. In an embodiment, the task launching service 416 manages the performance of tasks on each of the computing resources. In an embodiment, the resource management service 412 provides a list of computing resources on which the task is to be performed to the task launching service 416. In an embodiment, the task launching service 416 acquires network address information from the resource management service 412 for each of the computing resources. Using the acquired address information, in an embodiment, the task launching service 416 contacts each computing resource and causes the task to be performed. In an embodiment, tasks are performed invoking a remote procedure call on each computing resource. In an embodiment, the task launching service 416 acquires results for each task which are then used by the adaptive threshold service 408 to update the velocity and workflow failure criterion. In an embodiment, the task launching service 416 continues performing tasks on individual computing resources until the workflow is complete or the failure criterion is met, causing the workflow to be aborted. In an embodiment, the resource management service 412 maintains state information for the computing resources in the resource data store 414. In an embodiment, the resource management service 412 records the state of each resource before launching the task on the resource. In an embodiment, if the task fails, the resource management service 412 restores the state of the associated resource using the stored state information.

Figure 5:
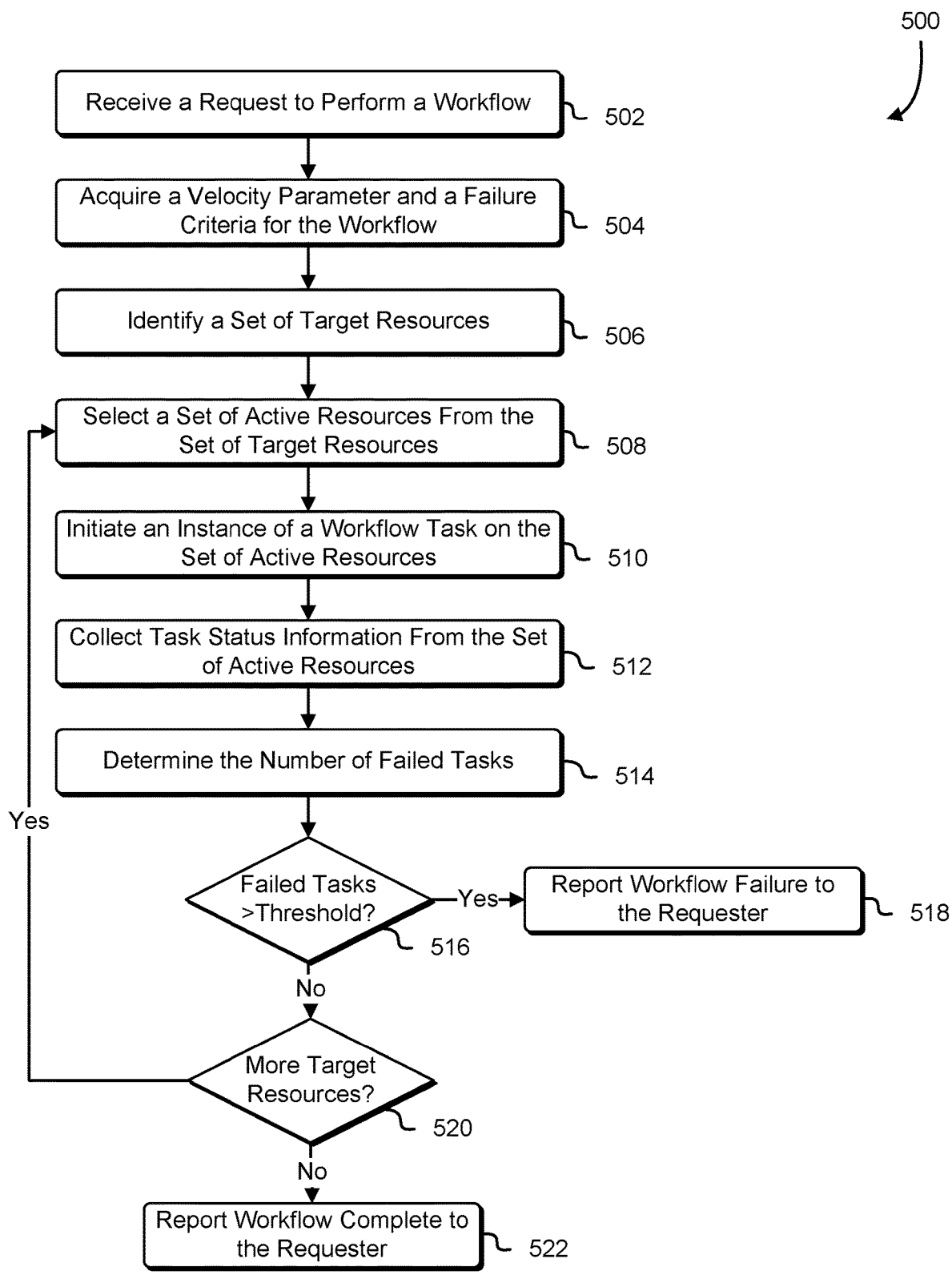
FIG. 5 shows an illustrative example of a process in accordance with one embodiment.

FIG. 5 shows an illustrative example of a process in accordance with one embodiment. A flowchart 500 illustrates an embodiment of a process that, as a result of being performed by a workflow orchestration server, executes a workflow on a set of resources in accordance with a set of workflow parameters. In an embodiment, the process begins at block 502 with a workflow orchestration server receiving a workflow request. In an embodiment, the workflow request identifies a task that is to be performed on a set of resources. In an embodiment, the request is received from a workflow administrator operating a workflow management console. In an embodiment, the workflow management console is a browser on the client computer system, and the workflow request is submitted over a computer network to the workflow orchestration server using a web interface.

In an embodiment, at block 504, the workflow orchestration server acquires a velocity parameter and a failure criterion for the workflow. In an embodiment, the velocity parameter and the failure criterion are provided to the workflow orchestration server with the workflow request. In an embodiment, the velocity parameter and a failure criterion are provided separately from the workflow request. In an embodiment, the velocity parameter imposes a limitation on the number of tasks that can be active at one time for a particular workflow. In an embodiment, the failure criterion identifies a condition that, when satisfied, causes the workflow orchestration server to stop performance of the workflow. In an embodiment, at block 506, the workflow orchestration server identifies a set of target resources on which the task is to be performed. In an embodiment, the set of target resources is a set of computing resources. In an embodiment, the set of target resources is a data object. In an embodiment, the data object is information in a data structure or information in a database such as a database row or database record. In an embodiment, the workflow orchestration server receives an identity token with the workflow request. In an embodiment, the identity token verifies the identity of the requester and provides an authorization that allows tasks to be performed on behalf of the requester. In an embodiment, the identity token is signed using a digital signature of the requester. In an embodiment, when the workflow orchestration server submits a task to a computing resource, the workflow orchestration server provides the identity token with the submission thereby allowing the computing resource to perform the task using the resources and permissions that are available to the workflow requester.

In an embodiment, at block 508, the workflow orchestration service selects a set of active resources from the set of target resources. In an embodiment, the number of active resources selected is controlled by the velocity parameter for the workflow. In an embodiment, the workflow orchestration server determines the number of currently active tasks, and selects a number of additional target resources such that the total number of active tasks is in accordance with the velocity parameter. In an embodiment, at block 510, the workflow orchestration server initiates a new task instance on each of the selected active resources so that the total number of active tasks is in accordance with the velocity parameter. In an embodiment, at block 512, the workflow orchestration server receives results from one or more of the active tasks, and updates associated task information maintained by the workflow orchestration server. In an embodiment, at block 514, the workflow orchestration server determines the total number of completed and failed tasks. At decision block 516, in an embodiment, the workflow orchestration server determines whether the number of failed tasks exceeds a threshold defined by the failure criterion provided with a workflow request. If the number of failed tasks exceeds the threshold defined by the failure criterion, execution advances to block 518 where, in an embodiment, the workflow orchestration server reports that the workflow has failed to the requester. In an embodiment, if the number of failed tasks does not exceed the threshold defined by the failure criterion, execution advances to block 520. At block 520, if there are remaining target resources to be processed by the workflow orchestration service, execution returns to block 508 and additional active resources are selected.

In an embodiment, if there are no remaining target resources to be processed, execution advances to block 522. In an embodiment, at block 522, the workflow orchestration server determines that the workflow completed successfully and reports the workflow status to the requester. In an embodiment, the workflow orchestration server reports the number and identity of the failed tasks to the requester. In an embodiment, the workflow orchestration server reports the identity of the target resources associated with the failed tasks.

Figure 6:
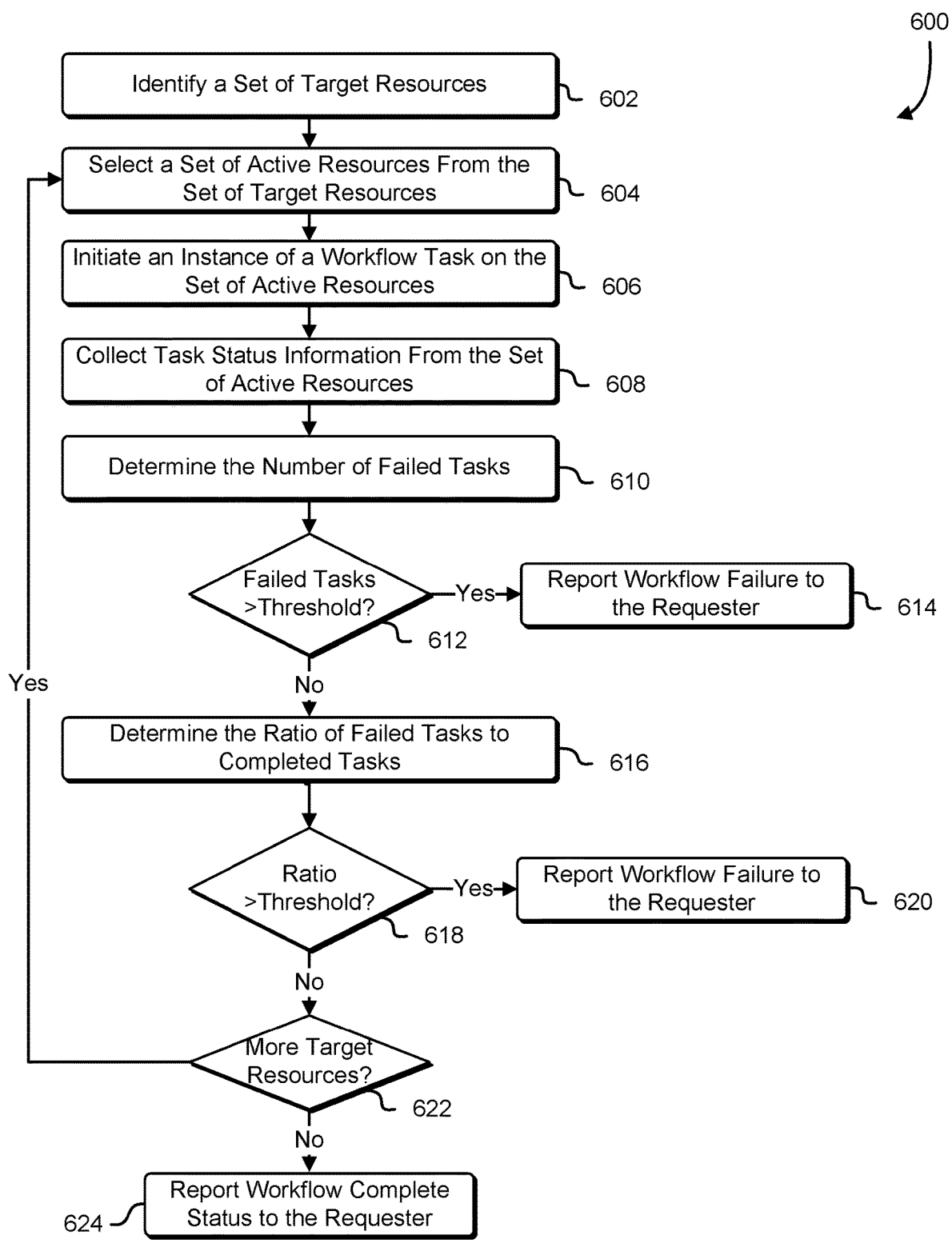
FIG. 6 shows an illustrative example of a process in accordance with one embodiment.

FIG. 6 shows an illustrative example of a process in accordance with one embodiment. A flowchart 600 illustrates an embodiment of a process that, as a result of being performed by a workflow orchestration server, modifies a workflow failure parameter as a workflow is performed. In an embodiment, at block 602, the workflow orchestration server identifies a set of target resources on which a task will be performed. In an embodiment, at block 604, the workflow orchestration server selects a set of active resources from the set of target resources such that the number of active resources is in accordance with a velocity parameter associated with the workflow. In an embodiment, at block 606, the workflow orchestration server initiates an instance of the task on each of the selected active resources. In an embodiment, task instances may be initiated using a web API, a remote procedure call, or other remote process execution interface. In an embodiment, each task instance runs on the workflow orchestration server that operates on remote data that is associated with the target resource.

In an embodiment, at block 608, as the active tasks are completed, the workflow orchestration server receives results from one or more of the active tasks, and updates associated task information maintained by the workflow orchestration server. In an embodiment, at block 610, the workflow orchestration server determines the total number of completed and failed tasks. At decision block 612, in an embodiment, the workflow orchestration server determines whether the number of failed tasks exceeds a threshold defined by the failure criterion provided with a workflow request. If the number of failed tasks exceeds the threshold defined by the failure criterion, execution advances to block 614 where, in an embodiment, the workflow orchestration server reports that the workflow has failed to the requester. In an embodiment, if the number of failed tasks does not exceed the threshold defined by the failure criterion, execution advances to block 616. In an embodiment, at block 616, the workflow orchestration server determines the ratio of failed tasks to completed tasks. In an embodiment, at decision block 618, the workflow orchestration server determines whether the ratio of failed tasks to completed tasks is less than a threshold ratio. In an embodiment, the threshold ratio is provided as a workflow parameter with the workflow request. In an embodiment, threshold ratio is computed from the failure criterion by dividing an allowed number of failed tasks in the workflow by the total number of target resources. If the ratio of failed tasks to completed tasks is greater than a threshold, execution advances to block 620 where, in an embodiment, the workflow orchestration server reports that the workflow has failed.

At decision block 622, if there are remaining target resources to be processed by the workflow orchestration service, execution returns to block 604 and additional active resources are selected. In an embodiment, if there are not remaining target resources to be processed, execution advances to block 624. In an embodiment, at block 624, the workflow orchestration server determines that the workflow completed successfully and reports the workflow status to the requester. In an embodiment, the workflow orchestration server reports the number and identity of the failed tasks to the requester. In an embodiment, the workflow orchestration server reports the identity of the target resources associated with the failed tasks.

Figure 7:
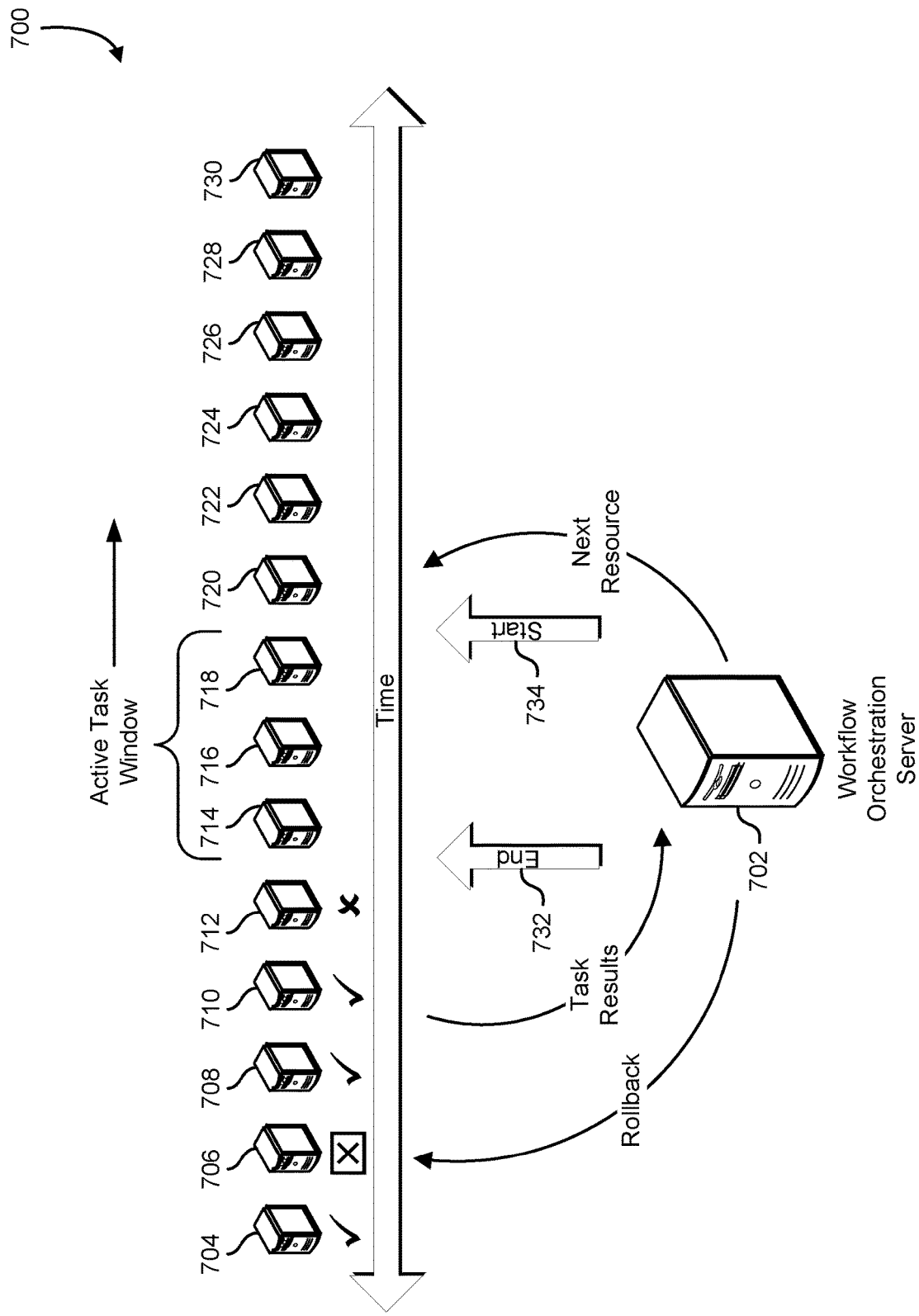
FIG. 7 shows an illustrative example of processing a workflow accordance with one embodiment.

FIG. 7 shows an illustrative example of processing a workflow in accordance with one embodiment. A diagram 700 illustrates an embodiment of processing workflow where the workflow orchestration server attempts to rollback the effects of task execution failures. In an embodiment, the workflow orchestration server 702 is a server computer system, virtual computer system, or computing service that hosts a workflow orchestration service. In an embodiment, functionality of the workflow orchestration server is implemented using a cluster of devices distributed over a network. In an embodiment, the workflow orchestration service includes a set of executable instructions stored on a memory that, when executed by a processor on the workflow orchestration server 702, cause the workflow orchestration server 702 to process the workflow. In an embodiment, the workflow orchestration server 702 receives a workflow request and a set of workflow parameters. In an embodiment, the set of workflow parameters includes a window size.

In an embodiment, a workflow orchestration server 702 submits a task to each computing resource in a collection of computing resources. In an embodiment, the collection of computing resources includes a set of resources that have been processed by the workflow orchestration server 702, a set of resources that have not yet been processed by the workflow orchestration server 702, and a set of active resources. In an embodiment, individual resources are selected from the set of resources that have not yet been processed, and a task is launched on the selected resource. In an embodiment, after the task completes on the selected resource, the selected resource provides a task result to the workflow orchestration server 702, and the selected resource is added to the set of resources that have been processed by the workflow orchestration server 702. In an embodiment, each computing resource returns a task result to the workflow orchestration server 702 that indicates whether the task completed successfully, failed without restoring the associated resource to its original state, or failed but restored the associated resource to its original state. In the example shown in FIG. 7, the set of resources that have been processed by the workflow orchestration server 702 includes a first resource 704, a second resource 706, a third resource 708, a fourth resource 710, and a fifth resource 712; the set of active resources includes a sixth resource 714, a seventh resource 716, and an eighth resource 718; and the set of resources that have not yet been processed by the workflow orchestration server 702 includes computing resources 720, 722, 724, 726, 728, and 730. In the example shown in FIG. 7, the first resource 704, the third resource 708, and the fourth resource 710 were processed successfully, and the second resource 706, and the fifth resource 712 were not processed successfully.

In an embodiment, the workflow orchestration server 702 controls the performance of the workflow by maintaining an active task window with a start pointer 734 and an end pointer 732. In an embodiment, the width of the active task window encompasses the maximum number of allowable active resources in accordance with the workflow parameters. In an embodiment, the size of the active task window is adjusted so that the number of active resources within the window is in accordance with the workflow parameters. In an embodiment, as part of managing the workflow, the workflow orchestration server 702 determines the order in which the resources will be processed. In an embodiment, the start pointer 734 identifies the next resource to be processed by the workflow orchestration server 702. In an embodiment, the end pointer 732 indicates the division between resources that have completed processing and resources that are still being processed by the workflow orchestration server 702. In an embodiment, the start pointer 734 is advanced when additional task instances are launched on additional computing resources. In an embodiment, the end pointer 732 is advanced as results are received by the workflow orchestration server 702.

In an embodiment, as task results are received by the workflow orchestration server 702, the workflow orchestration server 702 determines whether a failure criterion for the workflow has been satisfied. In an embodiment, if the workflow orchestration server 702 determines that the failure criterion is satisfied, the workflow orchestration server stops launching tasks on the collection of computing resources, and reports that the workflow has failed. In an embodiment, if the workflow orchestration server 702 determines that the failure criterion is satisfied, the workflow orchestration server attempts to return the collection of computing resources to their original state at the time workflow processing was initiated. If the workflow orchestration server 702 receives a task result from each computing resource in the collection of computing resources without the failure criterion being satisfied, the processing of the workflow is complete, and the workflow orchestration server 702 provides a success status for the workflow.

In an embodiment, the failure criterion is based on the number of tasks that have completed without being able to rollback the associated resource to an original state. In an embodiment, when determining whether the failure criterion is satisfied, tasks that are unsuccessful but where the associated resource is rolled back to its original state, are excluded from the determination.

Figure 8:
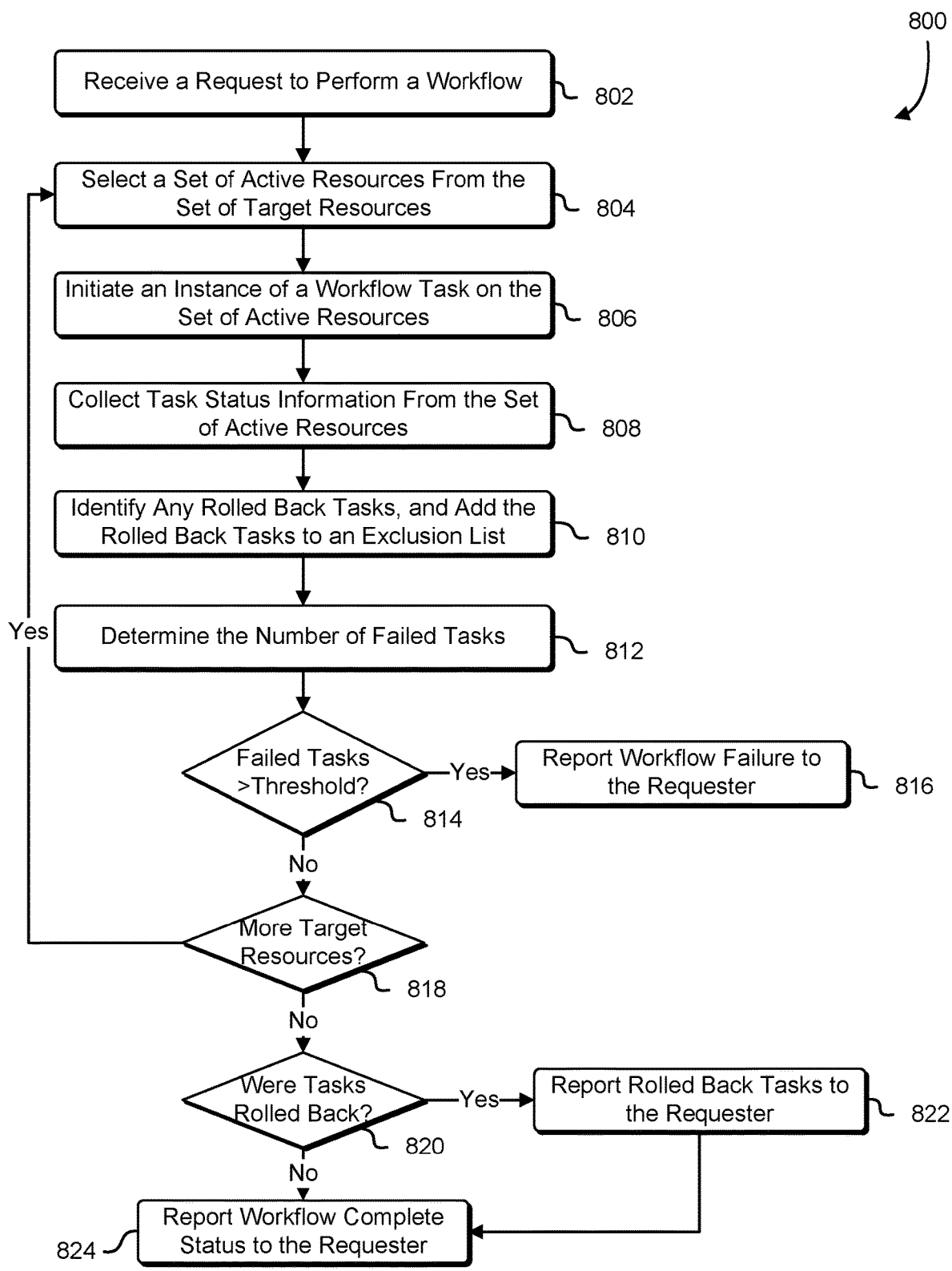
FIG. 8 shows an illustrative example of a process in accordance with one embodiment.

FIG. 8 shows an illustrative example of a process in accordance with one embodiment. A diagram 800 illustrates an embodiment of a process that, as a result of being performed by a workflow orchestration server, processes a workflow where individual target resources attempt to rollback the effect of failed tasks. In an embodiment, the process begins at block 802 with a workflow orchestration server receiving a workflow request. In an embodiment, the workflow orchestration server requires a velocity parameter and a failure criterion for the workflow with a workflow request. In an embodiment, the workflow request identifies a task that is to be performed on a set of resources. In an embodiment, the request is received from a workflow administrator operating a workflow management console. In an embodiment, the workflow management console is a browser on the client computer system, and the workflow request is submitted over a computer network to the workflow orchestration server using a web interface.

In an embodiment, at block 804, the workflow orchestration server identifies a set of target resources on which the task is to be performed. In an embodiment, the set of target resources is a set of computing resources. In an embodiment, the set of target resources is a data object such as a database row or database record. In an embodiment, the workflow orchestration service selects a set of active resources from the set of target resources. In an embodiment, the number of active resources selected is controlled by the velocity parameter for the workflow. In an embodiment, the workflow orchestration server determines the number of currently active tasks, and selects a number of additional target resources such that the total number of active tasks is in accordance with the velocity parameter. In an embodiment, at block 806, the workflow orchestration server initiates a new task instance on each of the selected active resources so that the total number of active tasks is in accordance with the velocity parameter. In an embodiment, at block 808, the workflow orchestration server receives results from one or more of the active tasks, and updates associated task information maintained by the workflow orchestration server. In an embodiment, at block 810, the workflow orchestration server identifies tasks that have completed where the associated resources have been rolled back to an original state. In an embodiment, the associated resources that have been rolled back to an original state are added to an exclusion list and removed from the set of target resources. In an embodiment, at block 812, the workflow orchestration server determines the total number of completed and failed tasks, excluding those tasks that are associated with resources on the exclusion list. At decision block 814, in an embodiment, the workflow orchestration server determines whether the number of failed tasks exceeds a threshold defined by the failure criterion provided with a workflow request. If the number of failed tasks exceeds the threshold defined by the failure criterion, execution advances to block 816 where, in an embodiment, the workflow orchestration server reports that the workflow has failed to the requester. In an embodiment, if the number of failed tasks does not exceed the threshold defined by the failure criterion, execution advances to decision block 818. At decision block 818, if there are remaining target resources to be processed by the workflow orchestration service, execution returns to block 804 and additional active resources are selected.

In an embodiment, if there are not remaining target resources to be processed, execution advances to decision block 820. In an embodiment, at decision block 820, the workflow orchestration server determines whether there were failed tasks where resources were rolled back to an original state by examining the exclusion list. If rolled back resources are identified, in an embodiment, the workflow orchestration server reports the contents of the exclusion list to the requester at block 822. If the exclusion list is empty, or after the contents of the exclusion list are reported, execution advances to block 824. In an embodiment, at block 824, the workflow orchestration server determines that the workflow completed successfully and reports the workflow status to the requester. In an embodiment, the workflow orchestration server reports the number and identity of the failed tasks to the requester. In an embodiment, the workflow orchestration server reports the identity of the target resources associated with the failed tasks.

Figure 9:
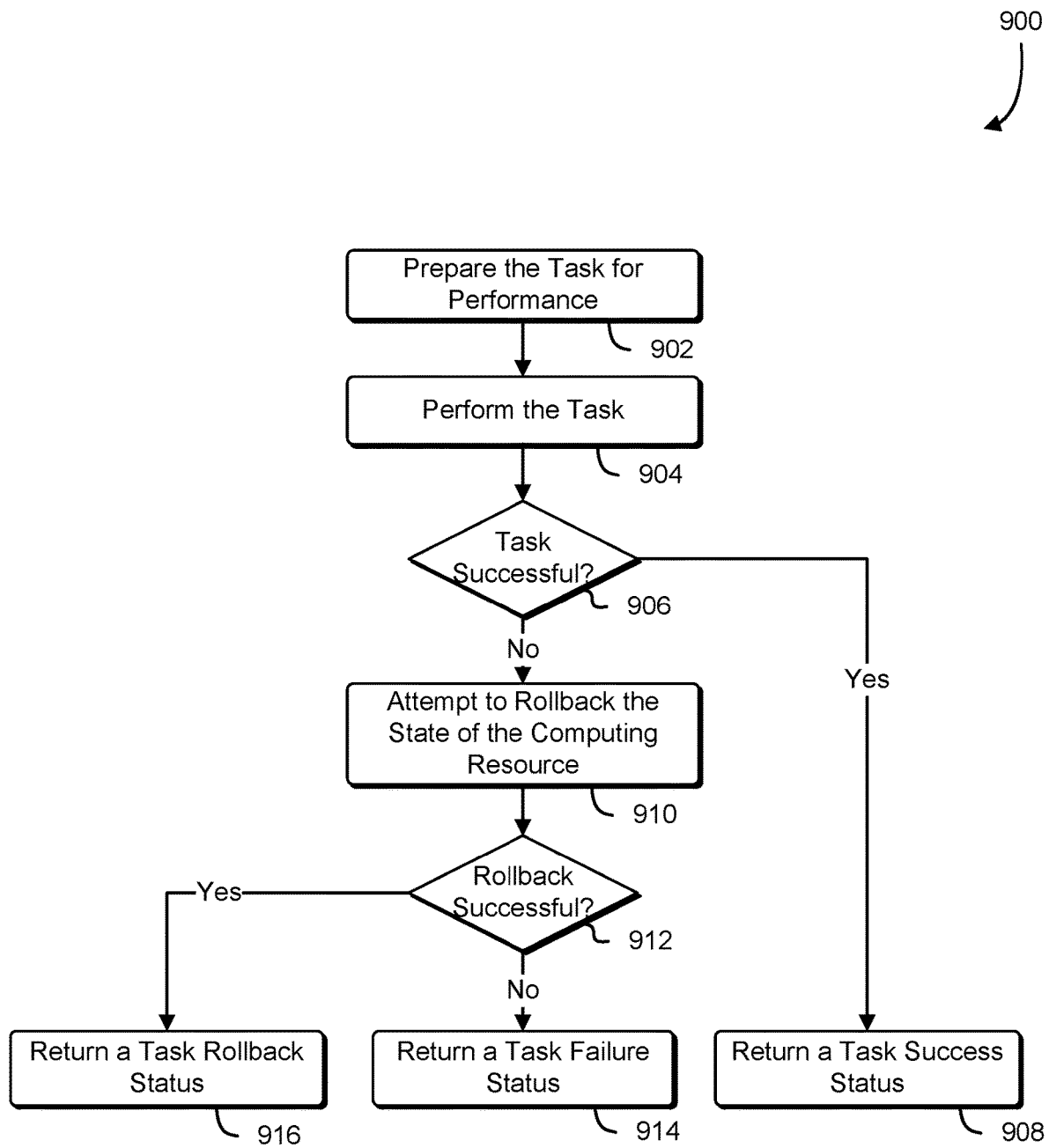
FIG. 9 shows an illustrative example of a process in accordance with one embodiment.

FIG. 9 shows an illustrative example of a process in accordance with one embodiment. A flowchart 900 illustrates an embodiment of a process that, as a result of being performed by a target computing resource, executes a task associated with a workflow request. In an embodiment, the target computing resource may be a computer system, a computer server, a virtual computer system instance, a runtime engine, a serverless computing environment, or a processing service. In an embodiment, at block 902, a target computing resource receives a task definition from a workflow orchestration server and prepares the task for execution. In an embodiment, preparing the task for execution is accomplished by compiling a set of source code instructions into native operations that are compatible with the target computing resource. In an embodiment, preparing the task for execution is accomplished by loading a set of instructions into executable memory in the target computing resource. In an embodiment, preparing the task for execution is accomplished by identifying an executable image stored in memory on the target computing resource, and that is identified by the workflow orchestration server. In an embodiment, at block 904 the target computing resource performs the task by executing the executable instructions associated with the task. In an embodiment, the task returns a result indicating whether the task was successful or failed.

In an embodiment, at decision block 906, the target computing resource determines whether the task was successful. If the task was successful, execution advances to block 908 and the target computing resource returns a success status to the workflow orchestration server. If the task was not successful, execution advances to block 910. In an embodiment, at block 910, the target computing resource attempts to reverse the effects of having attempted to perform the task. In an embodiment, the target computing resource saves state information of the target computing resource before the task is performed, and if the task fails, the saved state information is restored. In an embodiment, the target computing resource executes a recovery method that is included with the task definition. In an embodiment, at decision block 912, the target computing resource determines whether the state information was successfully restored. If the state information was not successfully restored, execution advances to block 914 and the target computing resource provides a failure status to the workflow orchestration server. If the state information was successfully restored, execution advances to block 916 and the target computing resource provides a task rollback status to the workflow orchestration server. In an embodiment, the task rollback status indicates to the workflow orchestration server that the task was attempted unsuccessfully, and the state of the target computing resource was not altered.

Figure 10:
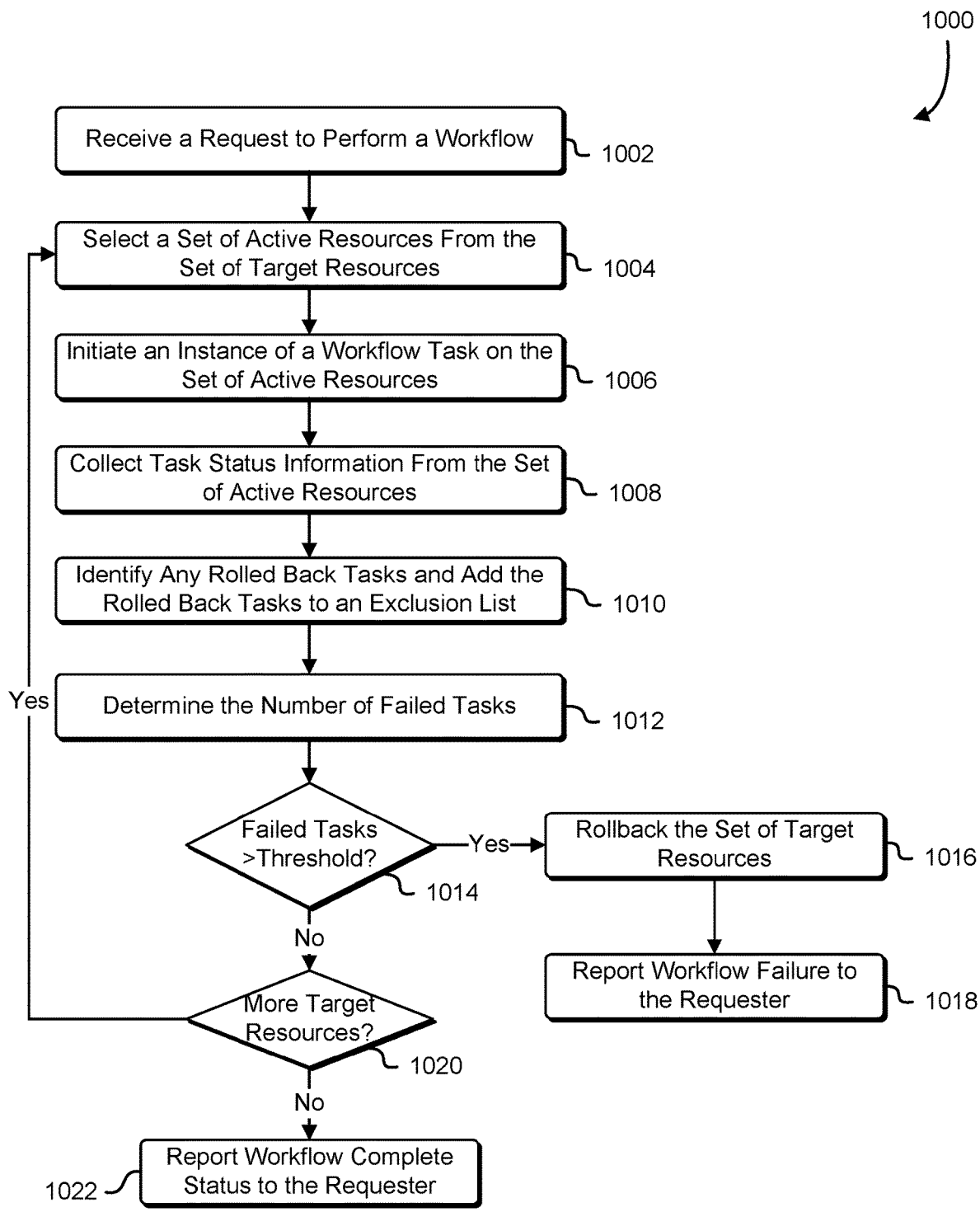
FIG. 10 shows an illustrative example of a process in accordance with one embodiment.

FIG. 10 shows an illustrative example of a process in accordance with one embodiment. A flowchart 1000 illustrates an embodiment of a process that, as a result of being performed by a workflow orchestration server, attempts to rollback the effects of a failed workflow. In an embodiment, the process begins at block 1002 with a workflow orchestration server receiving a workflow request. In an embodiment, the workflow orchestration server requires a velocity parameter and a failure criterion for the workflow with a workflow request. In an embodiment, the workflow request identifies a task that is to be performed on a set of resources. In an embodiment, the request is received from a workflow administrator operating a workflow management console. In an embodiment, the workflow management console is a browser on the client computer system, and the workflow request is submitted over a computer network to the workflow orchestration server using a web interface.

In an embodiment, at block 1004, the workflow orchestration server identifies a set of target resources on which the task is to be performed. In an embodiment, the set of target resources is a set of computing resources. In an embodiment, the set of target resources is a data object such as a database row or database record. In an embodiment, the workflow orchestration service selects a set of active resources from the set of target resources. In an embodiment, the number of active resources selected is controlled by the velocity parameter for the workflow. In an embodiment, the workflow orchestration server determines the number of currently active tasks, and selects a number of additional target resources such that the total number of active tasks is in accordance with the velocity parameter. In an embodiment, at block 1006, the workflow orchestration server initiates a new task instance on each of the selected active resources so that the total number of active tasks is in accordance with the velocity parameter. In an embodiment, at block 1008, the workflow orchestration server receives results from one or more of the active tasks, and updates associated task information maintained by the workflow orchestration server. In an embodiment, at block 1010, the workflow orchestration server identifies tasks that have completed where the associated resources have been rolled back to an original state. In an embodiment, the associated resources that have been rolled back to an original state are added to an exclusion list and removed from the set of target resources. In an embodiment, at block 1012, the workflow orchestration server determines the total number of completed and failed tasks, excluding those tasks that are associated with resources on the exclusion list. At decision block 1014, in an embodiment, the workflow orchestration server determines whether the number of failed tasks exceeds a threshold defined by the failure criterion provided with a workflow request. If the number of failed tasks exceeds the threshold defined by the failure criterion, execution advances to block 1016 where, in an embodiment, the workflow orchestration server attempts to reverse the effects of the completed task by returning the target resources to their original state at the time the workflow was initiated. In an embodiment, the workflow orchestration server saves the state of the target resources when the workflow request is received, and restores the saved state at block 1016. In an embodiment, at block 1018, the workflow orchestration server reports that the workflow has failed to the requester. In an embodiment, if the number of failed tasks does not exceed the threshold defined by the failure criterion, execution advances to decision block 1020.

At decision block 1020, if there are remaining target resources to be processed by the workflow orchestration service, execution returns to block 1004 and additional active resources are selected. In an embodiment, if there are not remaining target resources to be processed, execution advances to block 1022. In an embodiment, at block 1022, the workflow orchestration server determines that the workflow completed successfully and reports the workflow status to the requester. In an embodiment, the workflow orchestration server reports the number and identity of the failed tasks to the requester. In an embodiment, the workflow orchestration server reports the identity of the target resources associated with the failed tasks.

Figure 11:
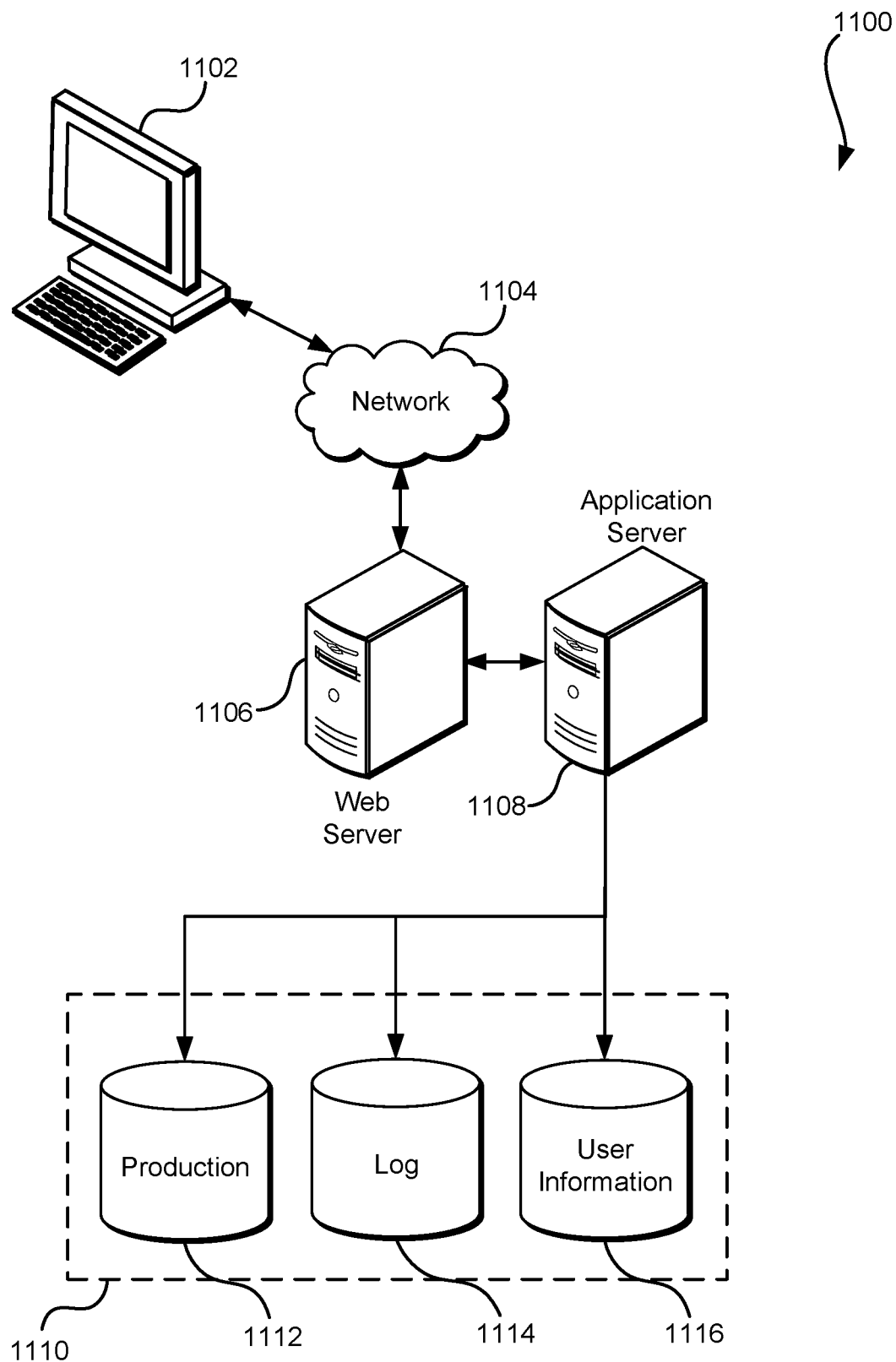
FIG. 11 illustrates an illustrative example of a system in which various embodiments can be implemented.

FIG. 11 illustrates a system 1100 for implementing aspects in accordance with one embodiment. In an embodiment, a web-based system is used. The system includes an electronic client device 1102, which can include any appropriate device operable to send and/or receive requests, messages, or information over an appropriate network 1104 and, in an embodiment, convey information back to a user of the device. In an embodiment, client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network, and/or combination thereof. In an embodiment, components used for such a system can depend at least in part on the type of network and/or system selected. In an embodiment, communication over the network can be enabled by wired or wireless connections and combinations thereof. In an embodiment, the network includes the Internet and/or publicly addressable communications network, as the system includes a web server 1106 for receiving requests and serving content in response thereto. In an embodiment, an alternative device serving a similar purpose is used for other networks.

In an embodiment, the illustrative system includes at least one application server 1108 and a data store 1110. In an embodiment, there are several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In an embodiment, the application server can include any appropriate hardware, software, and firmware that integrates with the data store as needed to execute aspects of one or more applications for the client device, handling some or all of the data access and business logic for an application. In an embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In an embodiment, content transferred to a client device is processed by the client device to provide the content in one or more forms including, but not limited to, forms that are perceptible to the user audibly, visually, and/or through other senses. In an embodiment, the handling of requests and responses, and the delivery of content between the client device 1102 and the application server 1108, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In an embodiment, the data store 1110 includes several separate data tables, databases, data documents, dynamic data storage schemes, and/or other data storage mechanisms and media for storing data relating to a particular aspect of the present disclosure. In an embodiment, the data store illustrated includes mechanisms for storing production data 1112 and user information 1116, which can be used to serve content for the production side. In an embodiment, the data store is shown to include a mechanism for storing log data 1114, which can be used for reporting, analysis, or other such purposes. In an embodiment, other aspects may be stored in the data store, such as page image information and access rights information, which can be stored in any of the above listed mechanisms as appropriate or in additional mechanisms in the data store 1110. In an embodiment, the data store 1110 is operable, through logic associated therewith, to receive instructions from the application server 1108 and obtain, update, or otherwise process data in response thereto. In an embodiment, the application server 1108 provides static, dynamic, or a combination of static and dynamic data in response to the received instructions. In an embodiment, dynamic data, such as data used in web logs (blogs), shopping applications, news services, and other such applications is generated by server-side structured languages as described herein or may be provided by a content management system ("CMS") operating on, or under the control of, the application server. In an embodiment, a user, through a device operated by the user, submits a search request for a certain type of item, and the data store accesses the user information to verify the identity of the user and can access the catalog detail information to obtain information about items of that type, and then the information is returned to the user. In an embodiment, the information is returned as a results listing on a web page that the user is able to view via a browser on the client device 1102. In an embodiment, information for a particular item of interest is viewed in a dedicated page or window of the browser. The present disclosure is not limited to the context of web pages, and may be applicable to processing requests in general where the requests are not requests for content.

In an embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. In an embodiment, such a system could have a fewer or a greater number of components than are illustrated in FIG. 11. Thus, the depiction of the system 1100 in FIG. 11 should be taken as being illustrative in nature and not limiting to the scope of the disclosure.

An embodiment can be implemented in a wide variety of systems, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual computer system, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In an embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In an embodiment, the protocol is a reliable connection-oriented protocol such as TCP. In an embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In an embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the server (s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In an embodiment, the server(s) include one or more database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In an embodiment, these reside in a variety of locations, such as on a storage medium local to (and/or resident in) one or more of the computers or remote from any or all of the computers across the network. In an embodiment, the information may reside in a storage-area network ("SAN") familiar to those skilled in the art. In an embodiment, files for performing the functions attributed to the computers, servers or other network devices may be stored locally and/or remotely, as appropriate. In an embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device.

In an embodiment, a service may be implemented using a serverless computing service. In an embodiment, a serverless computing service is a service that allows users to submit requests for program execution to the service without being assigned a particular computing resource. In an embodiment, requests for execution on a serverless computing service are stateless from the standpoint of the service, and any program state is passed in with the request. In an embodiment, serverless computing services improve the scalability of the system by allowing requests to be fulfilled using a variety of physical processing resources under the control of the serverless computing service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
obtaining a request to perform a workflow, the request including a definition of a task to be executed on a plurality of computing resources and a set of workflow parameters, the set of workflow parameters indicating a limitation on a number of active virtual computer system instances running the task on the plurality of computing resources and a failure criterion for the workflow;
initiating performance of the workflow by launching the task on a limited number of the plurality of computing resources such that a number of active virtual computer system instances running the task is in accordance with the limitation on the number of active virtual computer system instances;
determining that the failure criterion has been satisfied before the workflow is complete; and
as a result of determining that the failure criterion is satisfied, stopping the workflow before the task is performed on all of the plurality of computing resources.

2. The method of claim 1, further comprising:
identifying a failed task instance and an associated computing resource; and
rolling back a state of the associated computing resource to reverse effects of the failed task instance.

3. The method of claim 1, wherein:
the failure criterion is a threshold number of failed tasks; and
the threshold number is determined as a proportion of the number of computing resources.

4. The method of claim 1, further comprising determining the failure criterion as a function of a number of completed tasks.

5. A system, comprising:
one or more processors; and
memory storing computer-executable instructions that, if executed on the one or more processors, cause the system to:
obtain a request to perform a workflow, the request identifying a task to be executed on a plurality of resources and a set of workflow parameters that limit a number of active virtual computer system instances running the task;
initiate performance of the workflow by launching the task on the plurality of resources such that the number of active virtual computer system instances running the task is in accordance with the workflow parameters; and
abort the workflow as a result of determining that a failure criterion has been satisfied before the workflow is complete.

6. The system of claim 5, wherein the computer-executable instructions, if executed on the one or more processors, further cause the system to:

determine that a particular task instance running on a particular resource has failed; and as a result of determining that the particular task instance has failed, cause the particular resource to return to a state prior to when the particular task instance was launched.

7. The system of claim 5, wherein the computer-executable instructions, if executed on the one or more processors, further cause the system to:

determine that performance of the workflow was unsuccessful; and as a result of determining that the performance of the workflow was unsuccessful, cause each resource in the plurality of resources to return to a state when the workflow was initiated.

8. The system of claim 5, wherein:

the failure criterion is a threshold number of failed task instances;

the threshold number is dependent on a number of successful task instances, a number of failed task instances, and a number of rolled back task instances; and the computer-executable instructions, if executed on the one or more processors, further cause the system to recalculate the threshold as a result of acquiring a status of a completed task instance.

9. The system of claim 5, wherein the computer-executable instructions, if executed on the one or more processors, further cause the system to:

send an executable command sequence that implements the task to a computer system associated with a resource; and receive a result of the task from the computer system.

10. The system of claim 5, wherein the computer-executable instructions, if executed on the one or more processors, further cause the system to:

cause a serverless program execution service to execute a function that performs the task; and receive a result from the serverless program execution service.

11. The system of claim 5, wherein:

the task is defined as a state machine; and processing the state machine produces a result that indicates whether the resource was rolled back to an initial state.

12. The system of claim 5, wherein the plurality of resources are virtual computer system instances.

13. A non-transitory computer-readable storage medium with executable instructions stored thereon that, as a result of being executed by one or more processors of a computer system, cause the computer system to at least:

obtain a request to perform a workflow, the request identifying a task to be executed on a plurality of resources and a set of workflow parameters that limit a number of active virtual computer system instances of the task;

initiate performance of the workflow by launching the task on the plurality of resources such that the number of active virtual computer system instances running the task is in accordance with the workflow parameters; and abort the workflow as a result of determining that a failure criterion has been satisfied before the workflow is complete.

14. The non-transitory computer-readable storage medium of claim 13, wherein the instructions further comprise instructions that, as a result of being executed by the one or more processors, cause the computer system to:

determine that at least one of the task instances associated with the workflow has failed; and as a result of determining that at least one of the task instances associated with the workflow has failed, cause the plurality of resources to return to a prior state.

15. The non-transitory computer-readable storage medium of claim 13, wherein the instructions further comprise instructions that, as a result of being executed by the one or more processors, cause the computer system to:

determine that a particular task instance running on a particular resource has failed; and as a result of determining that the particular task instance has failed, return the particular resource a state prior to when the particular task instance was launched.

16. The non-transitory computer-readable storage medium of claim 13, wherein the instructions further include instructions that, if executed by the one or more processors, cause the computer system to create a virtual computer system instance for each task associated with the workflow.

17. The non-transitory computer-readable storage medium of claim 13, wherein the set of workflow parameters include one or more parameters that are provided to a task.

18. The non-transitory computer-readable storage medium of claim 13, wherein the instructions that cause the system to launch a task on a resource further include instructions that, if executed by the one or more processors, cause the computer system to:

send a set of executable instructions to the resource; and cause the set of executable instructions to be executed on the resource.

19. The non-transitory computer-readable storage medium of claim 13, wherein:

the resources are a set of data objects in a database;

the task is defined using a set of database commands; and launching the task is accomplished at least in part by submitting the set of database commands to a database service that holds the plurality of resources.

20. The non-transitory computer-readable storage medium of claim 13, wherein the plurality of resources is a plurality of data objects.

* * * * *